H. C. MURDOCK.
WAGON BRAKE.
APPLICATION FILED OCT. 2, 1909.
956,134.
Patented Apr. 26, 1910.
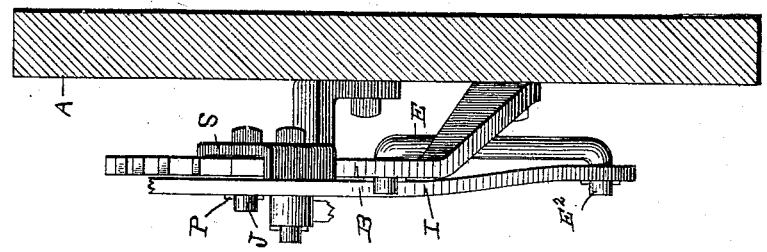
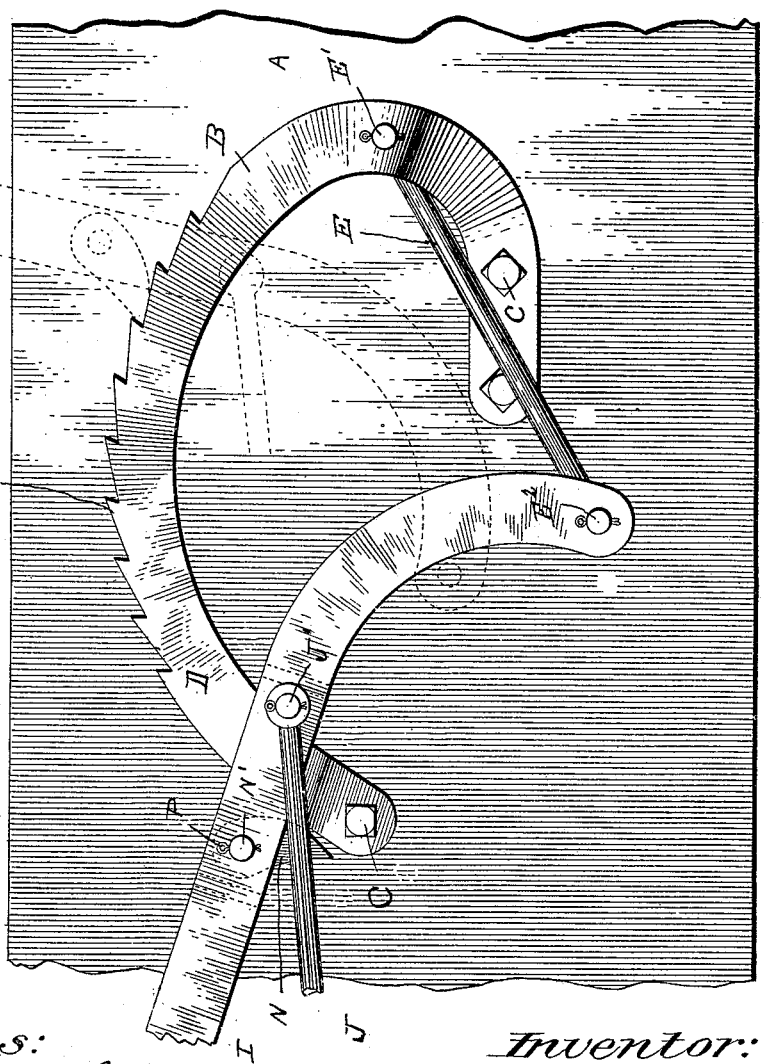
Witnesses:
Inventor:
Henry C Murdock

UNITED STATES PATENT OFFICE.

HENRY C. MURDOCK, OF CLAPPER, MISSOURI.

WAGON-BRAKE.

956,134.  Specification of Letters Patent.  Patented Apr. 26, 1910.

Application filed October 2, 1909. Serial No. 520,760.

*To all whom it may concern:*

Be it known that I, HENRY C. MURDOCK, a citizen of the United States, residing at Clapper, in the county of Monroe, in the State of Missouri, have invented a new and useful Wagon-Brake, of which the following is a specification.

This invention relates to new and useful improvements in wagon brakes and comprises various details of construction and combinations and arrangements of parts which will be hereinafter fully described and then specifically defined in the appended claim.

I illustrate my invention in the accompanying drawings, in which:—

Figure 1 is a side elevation showing my brake lever operating apparatus as applied to the side of a wagon box. Fig. 2 is a sectional view showing parts in elevation, and Fig. 3 is a detail view of a part of the device.

Reference now being had to the details of the drawings by letter, A designates the wagon box and B a curved bar, the ends of which are fastened one above the other to the sides of the box by means of bolts C. Said bar is bent outwardly at points D, D having a portion provided with the notches D' which are in a plane parallel with the box and spaced apart therefrom.

E designates a rod having an angled end E' which is pivotally mounted in the bar B, preferably at the location shown in Figs. 1 and 2 of the drawings, said rod E having its other end $E^2$ angled and pivotally connected to the lever I to which a rod J is pivotally connected at J'.

The upper convexed edge of the bar B is provided with ratchet teeth D' adapted to be engaged by the pawl N pivotally mounted upon the pin N' carried by the lever I, said pin N' being held in position by means of a key P.

The plate S, a detail of which is shown in Fig. 3 of the drawings, is held to the bar I by means of the pins J' and N' and serve as a guide to the lever I as it is swung back and forth.

What I claim to be new is:—

A wagon brake comprising, in combination with a wagon box, a curved bar fastened at its ends to the box and having outwardly bent portions with an intermediate part parallel to and spaced from the box, the upper convexed edge of the bar having ratchet teeth, a rod having angled ends, one of which is pivotally connected to said bar, a lever pivoted to its other end, a pawl carried by the lever and adapted to engage the teeth of said bar, an angled plate fastened to said lever with its ends engaging the latter, one upon either side of said bar and adapted to guide the lever as it is swung back and forth, and a rod pivoted to said lever adjacent to one end of said plate.

HENRY C. MURDOCK.

Signed in our presence:
  ROBT. MERIWETHER,
  ROY B. MERIWETHER.